(No Model.)

W. H. SOUTHWICK.
CORN PLANTER.

No. 361,463. Patented Apr. 19, 1887.

Witnesses
G. M. Gridley
E. R. Inman

Inventor
William H. Southwick
By Ermin & Benedict
Attorneys.

UNITED STATES PATENT OFFICE.

WILLIAM H. SOUTHWICK, OF EAST DELAVAN, WISCONSIN.

CORN-PLANTER.

SPECIFICATION forming part of Letters Patent No. 361,463, dated April 19, 1887.

Application filed May 10, 1886. Serial No. 201,695. (No model.)

*To all whom it may concern:*

Be it known that I, WILLIAM H. SOUTHWICK, of East Delavan, in the county of Walworth and State of Wisconsin, have invented new and useful Improvements in Corn-Planters; and I do hereby declare the following to be a full, clear, and exact description of said invention, reference being had to the accompanying drawings, and to the letters or figures of reference marked thereon, which form a part of this specification.

The object of my invention, in general terms, is the providing of mechanism for regulating and controlling the dropping of corn for seed in rows or hills in the ground, which mechanism is under the entire control of a person riding on the planter, whereby the corn may be dropped at even and regular intervals or otherwise, at the will of the operator.

Figure 1:
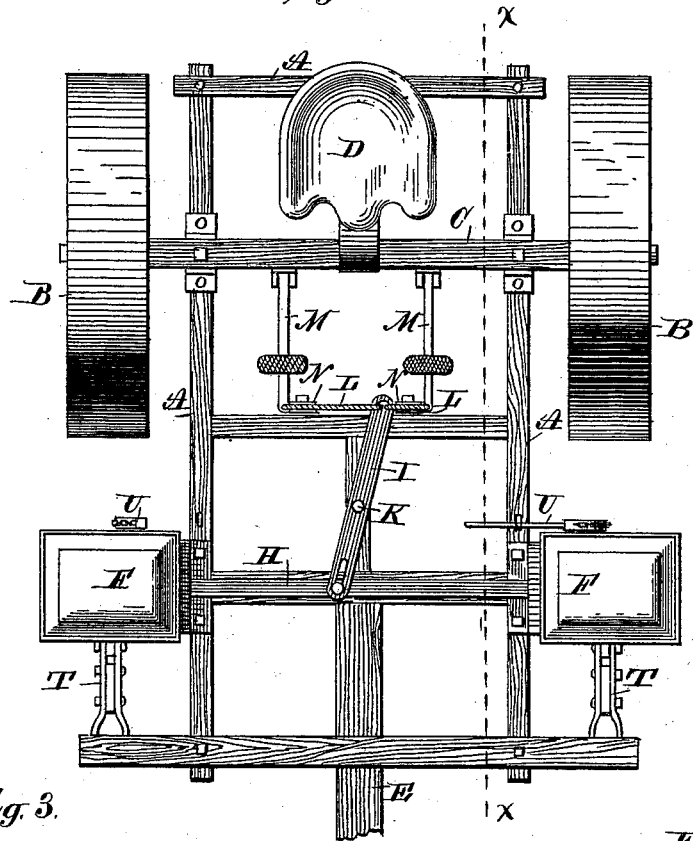
Figure 3:
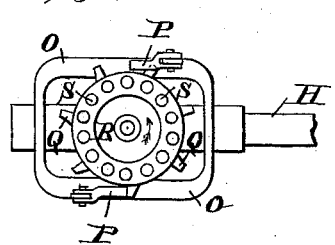
Figure 2:
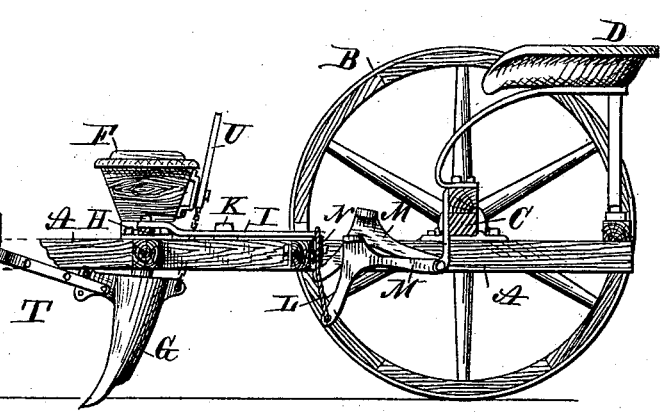

In the accompanying drawings, Figure 1 is a plan of my improved corn-planter. Fig. 2 is a vertical longitudinal section on line $x$ $x$ of Fig. 1. Fig. 3 is a plan of the seed-dropping mechanism.

The same letters refer to like parts in all the views.

The rectangular frame A is supported near its rear end by the two wheels B B, one on each side, rotating on the axle C, which axle is rigid to and a part of the frame A. A seat, D, for the driver or operator is supported on the frame between the wheels. A tongue, E, is affixed to the frame at its front end, to which, when in use, the team for hauling the planter is attached.

Near the front end of the frame two hoppers, F F, one on each side, are affixed to the frame. These hoppers are adapted to receive and hold a supply of corn for seed, and are located as far apart as the rows of corn are to be made.

Immediately below each of the hoppers is a tubular drill-tooth, G, having its lower front end formed to open a small furrow or channel in the ground as the planter is hauled along, into which the corn is to be dropped, this tooth being also adapted to receive the corn as it is dropped from the hopper, and permit it to fall therethrough into the furrow beneath and leave it there as the planter passes on. This tubular tooth is hinged at its front top edge to the frame by and through an arm, T, pivoted to the frame at its front end, and the tooth may be raised or lowered by a lever attached to the tooth at its rear top end, or by equivalent means.

The wheels B B are located directly behind the teeth G G, and are provided with wide tires, whereby, after the corn is dropped into the furrows made by the teeth G G, the wheels will, as the planter is hauled ahead, roll upon and press down the little ridges made by the teeth on each side of the furrow, thereby also covering the corn with the soil.

An aperture or throat leads from the bottom of each hopper F into the hollow tooth G beneath, which throat is intermittently opened and closed by mechanism operated by the reciprocally-endwise-moving bar H, located and supported on the frame A and extending across the frame into both the hoppers F F. A lever, I, centrally pivoted on the frame A, at K, is connected at one end by a pin and slot, or equivalent means, to the bar H, and at the other end is attached by a rope or chain, L, to the free front end of the treadles M M, one on each side of and at a little distance from the lever I. The connecting-rope L passes over antifriction pulleys N N, pivoted on the frame A.

The treadles M M at their rear ends are pivoted to the frame A, and their free front ends have a vertical oscillating movement. The lever I has a horizontal swinging movement, and the bar H reciprocates horizontally on the frame A.

It will be seen that the driver, sitting on the seat D, with his feet on the treadles M M, can by depressing first one and then the other of the treadles successively shift the bar H back and forth on the frame, whereby, by the mechanism in the hopper, the throat leading from the hopper into the tooth may be successively opened and closed, the mechanism being such that each complete movement of the bar H in one direction both opens and closes the throat or seed-dropping mechanism.

The seed-dropping mechanism may have any one of the many forms adapted for that purpose. The mechanism for that purpose shown in Fig. 3 consists of the bar H, to which is attached the slotted frame O, having on each side a latch or pawl, P, adapted, as frame O reciprocates with bar H, to engage the lugs Q on the periphery of a circular rotating plate, R, which plate is centrally pivoted on the frame A, and is provided with a series of vertical apertures, S S, adapted to receive one or more kernels of corn. This plate R rotates just beneath the true bottom of the hopper F, which bottom is provided with a single aperture over the line of rotation of the apertures S S, whereby, as the plate R rotates, corn drops through the single aperture in the true bottom of the hopper into each of the apertures S S successively, and the corn is carried around in the apertures S S by the rotation of the plate R, being held from dropping through plate R by a second plate or false bottom, immediately beneath the plate R, until it comes to an aperture provided therefor in this false bottom opening into the tooth G, when the corn drops through this false bottom and the tooth G into the furrow beneath.

What I claim as new, and desire to secure by Letters Patent, is—

In a corn-planter, two hoppers, F F, in combination with the horizontally-reciprocating bar H, adapted to intermittently open and close the hoppers F F, the straight single bar, centrally-pivoted swinging lever I, the connecting-cord L, running over pulleys N N, and the end-pivoted treadles M. M, all supported on frame A, substantially as described.

In testimony whereof I affix my signature in presence of two witnesses.

WILLIAM H. SOUTHWICK.

Witnesses:
 JOHN B. SIMMONS,
 H. A. BURDICK.